C. D. YOUNGBERG
March 31, 1931. TYPEWRITER Re. 18,017
Original Filed Jan. 2, 1925
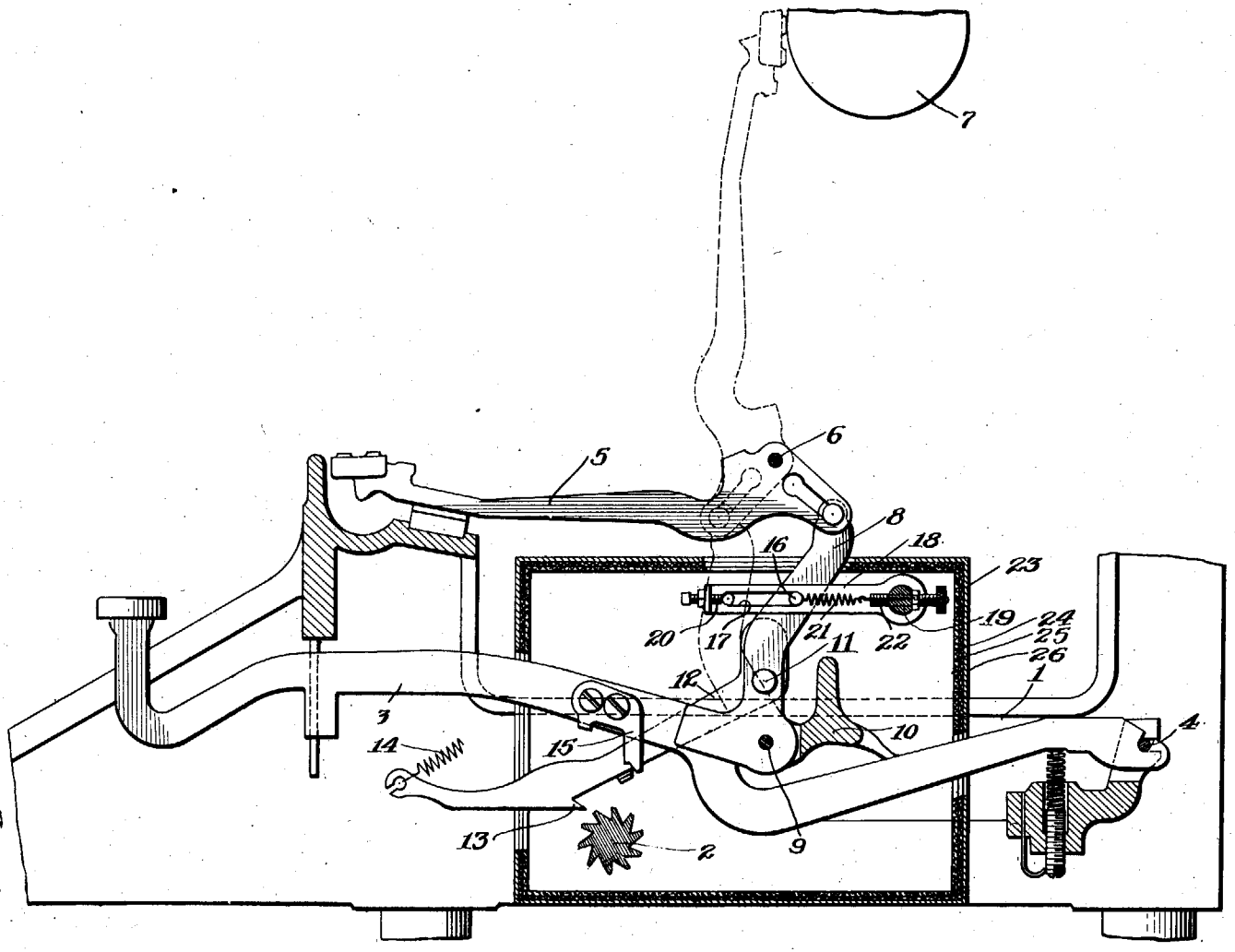
Inventor
Conrad D. Youngberg
By Nissen & Crane
Attys.

Reissued Mar. 31, 1931

Re. 18,017

UNITED STATES PATENT OFFICE

CONRAD D. YOUNGBERG, OF WOODSTOCK, ILLINOIS, ASSIGNOR TO WOODSTOCK TYPEWRITER COMPANY, OF WOODSTOCK, ILLINOIS, A CORPORATION OF ILLINOIS

TYPEWRITER

Original No. 1,677,315, dated July 17, 1928, Serial No. 30, filed January 2, 1925. Application for reissue filed January 31, 1931. Serial No. 512,758.

This invention relates to the type bar action of typewriter mechanism, and has for its object the provision of means for actuating the type bars which shall be of improved construction and operation and in which the noise incident to their operation shall be reduced to a minimum.

The invention is exemplified in the combination and arrangement of parts shown in the accompanying drawing and described in the following specification, and it is more particularly pointed out in the appended claims.

In the drawing, the figure is a somewhat diagrammatic sectional view showing one embodiment of the present invention.

The invention is shown as applied to a power driven typewriter, such as that described and claimed in the application of Otto A. Hokanson, Serial No. 732,615, but it will be understood that the invention is applicable to other forms of typewriting machines.

The numeral 1 designates a typewriter frame having a motor actuated roller 2 journaled therein and driven by any suitable source of power. Key levers 3 are pivotally mounted at 4. The type bars 5 are pivoted at 6 on any well-known form of type bar support and are arranged to engage a platen 7. The type bars are actuated by sub-levers 8 pivoted at 9 on a cross-bar 10, the sub-levers being connected by pivots 11 to actuators 12. The actuators 12 are provided with teeth 13 in position to engage the teeth on the power rollers 2, the actuator being held out of engagement with the power roller by springs 14. The key levers 3 are provided with contact members 15 by means of which the actuators 12 are depressed to engage the rollers 2. This will produce movement of the sub-levers 8 and the type bars 5. The power for actuating the type bars is furnished from the power roller 2 and it is only necessary to exert sufficient force on the key levers 3 to move the actuator corresponding to the particular key lever depressed into engagement with the drive roller.

Each of the sub-levers 8 is connected by means of a pin 16 and slot 17 to a stop link 18. The stop links 18 are mounted on a cross-bar 19 by means of which the links 18 may be adjusted fore and aft of the typewriter frame. At the forward end of each link 18 is an adjustable stop screw 20 which will arrest the pin 16 at the end of its forward movement at the proper time to permit the type on the type bar 5 to strike the paper on the platen 7 with sufficient force to make the required impression. A spring 21 is secured to each of the pins 16 and has its rear end attached to an adjustment screw 22 so that the tension in the spring 21 may be accurately adjusted. This spring will operate to produce a negative acceleration in the movement of the type bar 5 prior to the final arrest of the type bar by the stop screw 20. It will thus be seen that by the action of the spring 21 and the adjustable stop 20 the movement of the type bar 5 may be accurately controlled so that the bar will be arrested at the end of its movement with a minimum amount of shock and noise.

The location of the stop 20 for arresting the bar in close proximity to the pivotal support of the moving member reduces the amount of noise incident to the arrest of the type bar and at the same time makes it possible to locate the arresting stop in position where it may be enclosed in a sound deadening case shown at 23. This sound deadening case may be of any suitable construction, but preferably includes a layer 24 of fibrous material, such as felt, and a layer 25 of an inert metal, such as lead. The outer layer 26 may be of any suitable sheet metal to provide the necessary stiffness and support. Sheet aluminum is suitable for this purpose.

I claim:—

1. In a typewriter, a movable member, a bar having a slot extending longitudinally thereof, a stop on said member arranged to travel in said slot, and a spring for retarding the movement of said stop in said slot.

2. Typewriting mechanism comprising a type bar, a stop device including a slotted member, a pin movable in said slotted member, a spring for retarding the movement of said pin in said member, and an adjustable stop for arresting the movement of said pin.

3. Typewriting mechanism comprising a sub-lever having a lug thereon, a link having a slot in which said lug travels, said link having an adjustable stop for arresting the movement of said lug in said slot, and an adjustable spring for retarding the movement of said lug in said slot.

4. Typewriting mechanism comprising a type bar, a sub-lever for actuating said type bar, a power drive for actuating said sub-lever, a link having a slot therein, a lug on said sub-lever arranged to travel in said slot, an adjustable stop for arresting the movement of said projection at the end of the travel of said type bar, a spring secured at one end to said lug for retarding the movement of said lug prior to the arrest thereof, and means for adjusting the tension of said spring comprising an adjustment screw to which the opposite end of said spring is attached and a mounting in which said screw is adjustably movable to and from said lug.

5. Typewriting mechanism comprising a sub-lever having a projection thereon, a member mounted transversely of said sub-lever, a link mounted to said transverse member extending by the sub-lever in the direction of movement thereof and having a slot for the reception of said projection, a spring fixed at one end to said projection with its opposite end attached to an adjusting member for adjustably retarding the movement of the lug in said slot, and an adjustable stop at the outer end of the slot in said link for arresting the movement of said projection.

6. In a typewriting machine, a platen, a pivoted type bar, a sub-lever for actuating said type bar, a stop for arresting the movement of said sub-lever when said type bar is in operative relation with said platen, and a housing enclosing said stop and a portion of said sub-lever to confine the sound produced by the movement of said sub-lever.

7. In a typewriting machine, a platen, a pivotally mounted type bar, a pivoted sub-lever for actuating said type bar, a key lever for actuating said sub-lever, a movable stop for arresting said sub-lever when said type bar is in printing relation with said platen, and a housing having walls of sound deadening material enclosing said stop and the portion of said sub-lever which cooperates therewith.

8. In a typewriter, a sound confining housing having a wall comprising a support layer of sheet metal, a vibration deadening layer of inert metal, and a third layer of fibrous material.

In testimony whereof I have signed my name to this specification on this 16th day of January, 1931.

C. D. YOUNGBERG.